United States Patent
Sartain et al.

(10) Patent No.: US 8,494,681 B2
(45) Date of Patent: Jul. 23, 2013

(54) CONTROLLER FOR A CLIMATE CONTROL SYSTEM

(75) Inventors: John M. Sartain, St. Louis, MO (US); James P. Garozzo, St. Louis, MO (US); Anil Ramachandran, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 270 days.

(21) Appl. No.: 13/073,628

(22) Filed: Mar. 28, 2011

(65) Prior Publication Data

US 2012/0253520 A1 Oct. 4, 2012

(51) Int. Cl.
*G05B 13/00* (2006.01)
*G05B 11/01* (2006.01)
*G05B 15/00* (2006.01)
*G01M 1/38* (2006.01)
*G05D 23/00* (2006.01)

(52) U.S. Cl.
USPC ................................ 700/276; 700/17; 700/83

(58) Field of Classification Search
USPC .............................................. 700/17, 83, 276
See application file for complete search history.

(56) References Cited

U.S. PATENT DOCUMENTS

| | | | |
|---|---|---|---|
| 4,298,946 A * | 11/1981 | Hartsell et al. ................. | 700/278 |
| 5,065,813 A | 11/1991 | Berkeley et al. ................... | 165/1 |
| 5,603,451 A * | 2/1997 | Helander et al. ................. | 236/51 |
| 5,729,197 A * | 3/1998 | Cash ............................ | 340/539.3 |
| 6,070,110 A * | 5/2000 | Shah et al. ..................... | 700/278 |
| 6,169,937 B1 | 1/2001 | Peterson | |
| 6,513,723 B1 | 2/2003 | Mueller et al. | |
| 7,454,269 B1 | 11/2008 | Dushane et al. ................ | 700/276 |
| 7,693,591 B2 | 4/2010 | Hoglund et al. ................. | 700/83 |
| 7,748,640 B2 | 7/2010 | Roher et al. | |
| 7,844,764 B2 | 11/2010 | Williams ......................... | 710/63 |
| 7,957,839 B2 | 6/2011 | Takach et al. .................. | 700/276 |
| 2005/0159847 A1 * | 7/2005 | Shah et al. ..................... | 700/276 |
| 2005/0270151 A1 * | 12/2005 | Winick ....................... | 340/539.1 |
| 2006/0192022 A1 * | 8/2006 | Barton et al. .................... | 236/94 |
| 2009/0045263 A1 * | 2/2009 | Mueller et al. ................... | 236/51 |
| 2009/0082908 A1 * | 3/2009 | Green ........................... | 700/276 |
| 2009/0140064 A1 * | 6/2009 | Schultz et al. .................... | 236/51 |
| 2009/0261767 A1 * | 10/2009 | Butler et al. ..................... | 318/445 |
| 2012/0061480 A1 * | 3/2012 | Deligiannis et al. ............. | 236/51 |
| 2012/0227928 A1 * | 9/2012 | Green ........................... | 165/11.1 |

OTHER PUBLICATIONS

U.S. Appl. No. 13/073,286, Dated Mar. 28, 2011, Drake et al.
"1F98EZ-1421,-1441 Easy Install"; www.white-rodgers.com; Nov. 2010; pp. 1-8.

* cited by examiner

*Primary Examiner* — Ronald Hartman, Jr.
(74) *Attorney, Agent, or Firm* — Harness, Dickey & Pierce, P.L.C.

(57) ABSTRACT

A system is provided for controlling at least one climate control apparatus for conditioning a space. The system includes a controller mountable to a climate control apparatus that is segregated from the space to be conditioned. The controller has a plurality of selectable setting parameters for configuring the controller to operate at least one of a plurality of climate control apparatus, and a plurality of visual indicators for visually indicating the selection of at least one selectable setting parameter. A user interface is adapted for installation in the space, and has a display for displaying selectable setting parameters for configuring the controller. The user interface includes user input controls for enabling selection of at least one displayed selectable setting parameter, where the controller responsively activates at least one visual indicator for indicating the selection of at least one selectable setting parameter by the user-interface.

22 Claims, 7 Drawing Sheets

| Ref. # | Description of Features in order when using △ to choose; (Use ▽ to step back) | Press ◁ or ▷ Key to Select Options | | Displayed in Message Display |
|---|---|---|---|---|
| | | Displayed in Clock Digits (Default) | Options | |
| 1 | Outdoor / Condenser Configuration | AC1 | AC0, AC1, AC2, HP1, HP2 | CONDENSOR CONFIG |
| 2 | Indoor Heat Configuration | GA2 | FAN, GA1, GA2, EL1, EL2 | INDOOR HEAT CONFIG |
| 3 | B or O terminal (HP1, HP2 only) | O | O, b | REVERSING VALVE |
| 4 | Heat Cycle Rate | FA | SL, FA | HEAT CYCLE RATE |
| 5 | Cool Cycle Rate | FA | SL, FA | COOL CYCLE RATE |
| 6 | Auxiliary Cycle Rate (HP1, HP2 only) | FA | SL, FA | AUXILIARY CYCLE RATE |
| 7 | Energy Management Recovery | On | OFF, On | ENERGY MANAGEMENT RECOVERY |
| 8 | Outdoor Remote Sensor | OFF | OFF, On | OUTDOOR REMOTE SENSOR |
| 9 | Auxiliary Off (HP1, HP2 only) | OFF | OFF, 35-80 (in steps of 1 degree) From OFF, value changes to 80 | AUXILIARY OFF |
| 10 | Dual Fuel Config (HP1, HP2 only) | 40 | OFF, 0 to 50 (in steps of 1 degree) From OFF, value changes to 40 | DUAL FUEL CONFIG |
| 11 | Dehumidification | OFF | OFF, 40-80 (in 1% steps) - displayed in the last digits of the Message Area. From OFF, value changes to 60 | DEHUM XX% (where XX is the DEHUM set point) |
| 12 | Independent Dehumidification | OFF | OFF, On | INDEPENDENT DEHUMID |
| 13 | Humidification | OFF | OFF, 20-60 (in 1% steps) - displayed in the last digits of the Message Area. From OFF, value changes to 40 | HUMID XX% (where XX is the HUM set point) |
| 14 | Independent Humidification | OFF | OFF, On | INDEPENDENT HUMID |
| 15 | Compressor | OFF | OFF, On | COMPRESSOR |

CONTROLLER FOR A CLIMATE CONTROL SYSTEM

FIELD OF THE INVENTION

The present invention relates to controls for controlling residential heating, ventilation and air conditioning systems.

BACKGROUND OF THE INVENTION

Thermostats are typically used to control residential climate control systems, to maintain the temperature of a space relative to a set point by activating a heating or air conditioning unit to heat or cool the space. Some heating systems may include a fuel-fired heating apparatus, while others include a heat pump or an electric heat system. Air conditioning units provide conditioned air for cooling the space, while humidity controls provide for humidification or dehumidification. Depending on which systems are installed, different controllers are required for controlling activation of various components of a gas-fired heating unit, for example, or alternatively components of a heat pump. In the case of a heat pump with a back-up electric heat unit, the electric heat may also be turned on when the heat pump is not providing adequate heat. However, installation of such controllers requires identification of the specific types of air conditioning, heat pump and electric/gas heating systems used and the connections required for such systems. The complexities involved with the above can result in problems with incorrect configured or miss-wired systems.

SUMMARY OF THE INVENTION

This section provides a general summary of the disclosure, and is not a comprehensive disclosure of its full scope or all of its features.

Various embodiments of a controller are provided for controlling various types of climate control apparatus, such as heating, air conditioning and humidity control apparatus. In one preferred embodiment, a system is provided for controlling at least one climate control apparatus for conditioning a space. The system includes a controller mountable to a climate control apparatus that is segregated from the space to be conditioned. The controller has a plurality of selectable setting parameters for configuring the controller to operate at least one of a plurality of climate control apparatus, and a plurality of visual indicators for visually indicating the selection of at least one selectable setting parameter. A user interface is adapted for installation in the space, and has a display for displaying selectable setting parameters for configuring the controller. The user interface includes user input controls for enabling selection of at least one displayed selectable setting parameter, where the controller responsively activates at least one visual indicator for indicating the selection of at least one selectable setting parameter by the user-interface, to thereby provide confirmation of the setting selection.

In some embodiments, the system includes a controller that is mountable to a climate control apparatus segregated from the space, which includes input means for receiving communication of information indicating the selection of at least one selectable setting parameter for configuring the controller. A user interface is releasably connectable to a sub-base that is adapted for installation within the space to be conditioned. The user interface includes a display for displaying selectable setting parameters for configuring the controller, and user input controls for enabling selection of at least one of the displayed selectable setting parameters. A communication means provides for communication of information from the user interface to the input means of the controller, where the information indicates the selection of at least one selectable setting parameter. The user-interface is releasable from the sub-base and connectable to the controller, to enable selection of at least one selectable setting parameter via the user interface at the location of the controller, such that the controller can be configured to control operation of one or more climate control apparatus.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. According to one aspect of the present disclosure, embodiments of a system are provided for controlling various climate control apparatus for conditioning a space. The system includes a controller mountable to a climate control apparatus that is segregated from the space. The controller has selectable setting parameters for configuring the controller to control at least one of a plurality of climate control apparatus, and a plurality of visual indicators for indicating the selection of at least one setting parameter. A user interface is adapted for installation in the space, and has a display for displaying selectable setting parameters for configuring the controller, and user-input controls for selection of at least one displayed selectable setting parameter. The controller activates at least one visual indicator for indicating a selection of at least one selectable setting parameter by the user-interface.

In some embodiments, the system includes a controller mountable to a climate control apparatus segregated from the space, where the controller includes input means for receiving communication of information indicating a selection of at least one of a plurality of selectable setting parameters. A user interface is releasably connectable to a sub-base installed within the space. The user interface includes a display for displaying selectable setting parameters for configuring the controller, and user input controls for enabling selection of at least one of the displayed selectable setting parameters. A communication means communicates information from the user interface to the controller that indicates the selection of at least one selectable setting parameter. The user-interface is releasable from the sub-base and connectable to the controller to enable selection of at least one selectable setting parameter via the user interface at the location of the controller, such that the controller can be easily configured to control one or more climate control apparatus, as explained below.

Figure 1:
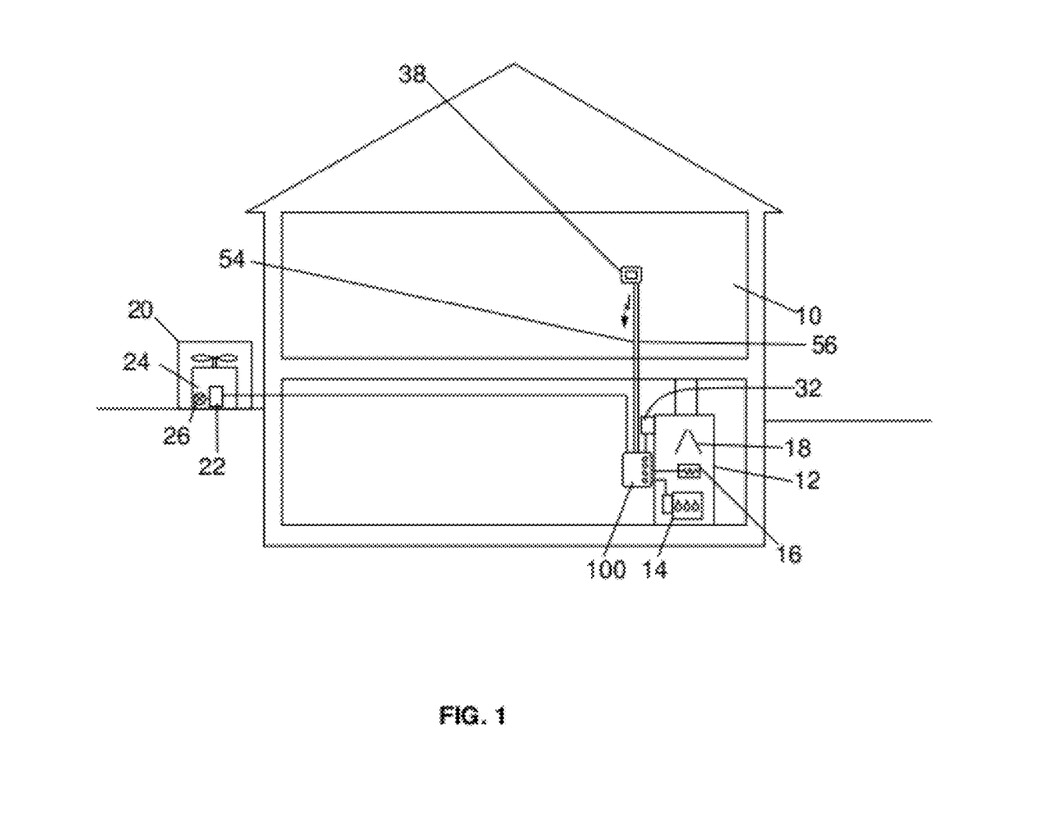
FIG. 1 is an illustration of a space having a gas fired heating system and an air conditioning and/or heat pump system, in which one embodiment of a controller and user interface may be implemented in accordance with the principles of the present disclosure.

Referring to FIG. 1, various types of climate control apparatus for conditioning a space 10 are shown. The various climate control systems preferably include an indoor air circulation unit 12, which may include a burner associated with a gas-fired heating unit 14. Alternatively, the heating unit may utilize electric heating elements 16 associated with indoor air circulation unit 12. The climate control system may further include an air conditioner unit 20 having a compressor 22, a condenser coil 24 and an A-coil 18 for providing cooling operation. The air conditioner compressor 22 may also be utilized with a reversing valve 26 in a heat pump mode, to provide for heating in combination with or in place of a gas or electric heating unit. The climate control system may further include a humidity control 32, such as a humidifier/dehumidifier. A controller 100 may control a switch for applying a voltage (via controller 100) for activating the humidity control at the same time as the indoor air circulation unit 12. Alternatively, where the humidity control is self-powered, the controller 100 may close a connection for activating the self-powered humidity control device.

According to one aspect of the present disclosure, a controller 100 is provided that is configurable for controlling operation of a plurality of climate control apparatus, such as those described above. As shown in FIG. 1, a climate control apparatus (e.g., air circulation unit 12) may be disposed in a basement or a closet. A controller 100 is disposed in close proximity to indoor air circulation unit 12 (or heating/air conditioning unit), such that the controller 100 is disposed outside of or segregated from the space 10. The controller 100 is configured to receive temperature information from at least one temperature sensing device disposed within the space 10. Preferably, the temperature sensing device is a user interface 38 that is capable of communicating temperature information to the controller 100. As shown in FIG. 1, the user interface 38 is wired to controller 100 via at least two wires 54,56, but may be in wireless communication with the controller 100. Alternatively, a thermostat or wireless remote temperature sensor may be used. One example of a wireless remote temperature sensor is a F0148-1328 remote sensor made by White-Rodgers, a Division of Emerson Electric Co., which is disclosed in co-assigned U.S. Pat. No. 6,513,723 entitled "Method and Apparatus For Automatically Transmitting Temperature Information", and is incorporated herein by reference.

The controller 100 is configured to receive the temperature information and compare it to a set-point temperature. The controller 100 is configured to provide commands for selectively controlling one or more switching devices for initiating activation signals to the various climate control apparatus, where the activation signals that activate each type of heating, air conditioning and/or humidity control apparatus are provided solely by the controller 100 (and not provided by a thermostat). Accordingly, a thermostat is not required for providing activation signals to the various climate control apparatus. The controller 100 may be used with or without a thermostat, and can provide all activation signals for controlling heating, air conditioning and/or humidity control operation regardless of whether input is received from a thermostat.

One example of such a controller 100 is disclosed in U.S. patent application Ser. No. 13/073,286 entitled "Wireless Control of a Heating or Cooling Unit," which is incorporated herein by reference and describes a controller 100 segregated from the space 10 that can control operation of an air conditioning and/or heating unit without receiving an input from a thermostat requesting heating or cooling operation. While the above controller 100 is configured to control activation of apparatus independent of a thermostat, the controller 100 of the present disclosure may be used with a thermostat that requests activation of climate control apparatus. The controller 100 is configured to control a plurality of switching devices to provide activation signals to one or more climate control apparatus, based on configuration setting parameters that the controller receives from the user interface 38, as explained below.

While the various embodiments of a controller 100 described in the present disclosure are capable of activating various heating, air conditioning and/or humidity control systems described above, each residence may have different configurations including one or more of the various described climate control apparatus. For example, some residences may have an air conditioner unit 20 and a gas-fired heating unit 14. Some residences may only have an air conditioner unit 20, or a heating system with electric heating elements 16. Other residences may have a gas-fired heating unit 14 and a heat-pump configured air conditioner unit 20 with a reversing valve 26. Some systems may also include back-up emergency heating via electric heating elements 16. Accordingly, for each particular residence, the controller 100 must be configured to control the specific collection of different climate control systems within the given residence.

According to one aspect of the present disclosure, various embodiments are provided of a controller 100 that is disposed outside of or segregated from the space 10 to be conditioned, which is configurable by an associated user interface 38 that is adapted to be installed within the space to be conditioned. Since the controller 100 and the user interface 38 are not co-located or within visible range of one another, it would seem that input of configuration data to the user interface 38 would need to be performed within the space 10 while configuration occurs in the controller 100 outside the space. This situation would require trips back and forth to confirm that the controller 100 is properly set-up and activates the selected system component. The present controller 100 and user interface 38 address these and other issues, as explained below.

Figure 2:
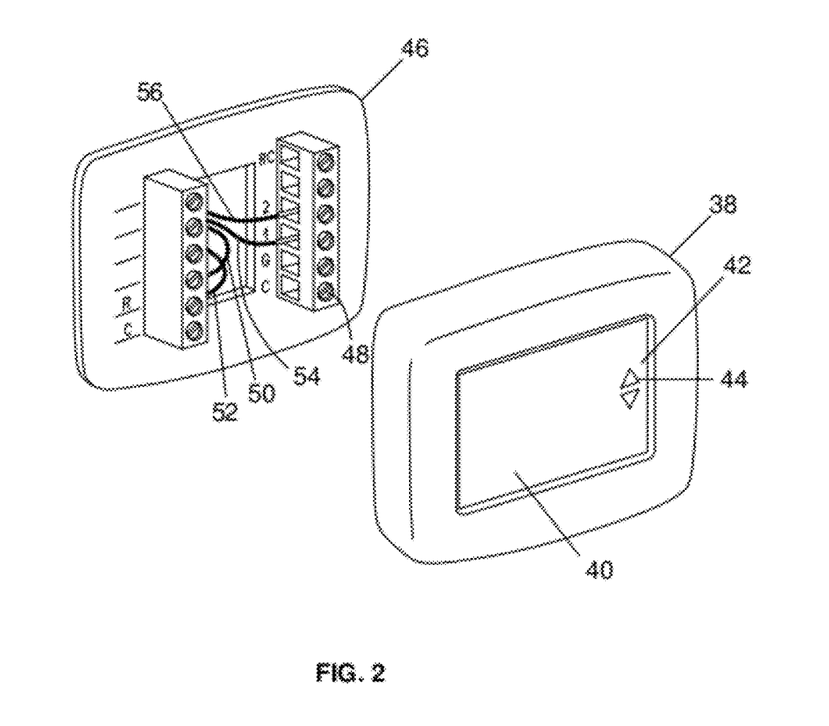
FIG. 2 is a front perspective view of one embodiment of a user interface, shown disassembled to illustrate connections of the user-interface, in accordance with the present disclosure.

Referring to FIG. 2, a user interface 38 is shown that includes a sensor configured to sense temperature. The user interface 38 may, for example, be a thermostat, which provides activation signals for climate control apparatus. A first portion of the user interface 38 includes a display 40 and input controls 42, 44 for enabling selection of configuration setting parameters. The user interface 38 is connectable to a sub-base portion 46 installed in a space 10. The connectors 48 enable connection of two wires 50 and 52 for providing power via a 24 volt alternating current transformer to terminals labeled "R" and "C," and connection of two wires 54 and 56 for providing communication (between the controller 100 and user interface 38) to terminals labeled "1" and "2." The user interface 38 is connected to the sub-base portion 46 in a manner such that pins in the user-interface mate with connections "R" and "C" for providing power, and with connections "1" and "2" that provide for communication.

Figure 3:
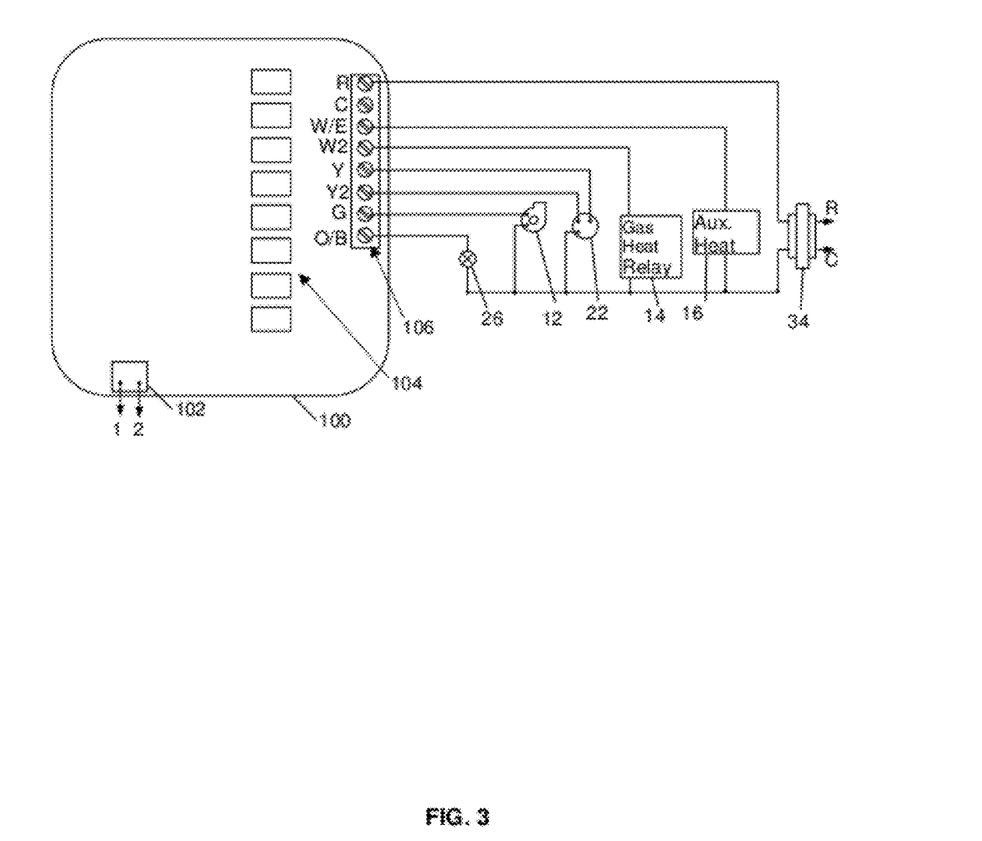
FIG. 3 is a schematic diagram of one embodiment of a controller, in accordance with the present disclosure.

Referring to FIG. 3, a first embodiment of a controller 100 includes output connections "1" and "2" for wired connection to the sub-base portion 46 of the user interface 38 (as in FIG. 2). A transformer 34 also provides "R" and "C" power connections to the sub-base portion 46 (shown in FIG. 2). The controller 100 includes a plurality of relays 104, and may generally comprise a relay panel. The controller 100 includes a plurality of connectors 106 associated with the relays 104 for enabling connection to various climate control apparatus. For example, the controller 100 may send a signal to a connector "G" and an associated wire for enabling connection of a voltage to an indoor air circulation unit 12, and may send a signal to a connector "Y" and wire for enabling connection of a voltage to a compressor 22 of an air conditioner unit 20, to establish cooling operation. The controller 100 may send a signal to a "W" connector and wire for enabling connection of a voltage to a gas-fired heating unit 14, or to connector "W/E" for activating electric heating elements 16 to establish heating operation. The controller 100 may send a signal to an "O/B" connector for a reversing valve 26 for utilizing the air conditioning compressor 22 in a heat pump mode, to provide for heating operation in combination with or in place of a gas or electric heating unit. In some climate control systems, electric heating elements 16 may be activated with the heat pump as a back up, for situations when the heat pump does not provide adequate heat (when sub-freezing outside temperatures limit the heat pump). The controller 100 is configurable to operate each of these climate control apparatus. As such, the controller 100 requires input of configuration setting parameters in order to know which connections to command/signal for activating the appropriate apparatus.

As shown in FIG. 1, the user interface 38 and controller 100 are connected to each other by at least a pair of wires that enable communication therebetween, where the user interface 38 may be connected via existing wires within the premises for a previous thermostat. While the controller 100 is mountable to a climate control unit segregated from the space 10 and user interface 38 is within the space 10 (such that the two devices are not co-located), configuration setting parameters may be input via the user interface 38 without requiring trips back and forth to test the system and confirm that settings have been correctly entered, as explained below.

Figure 4:
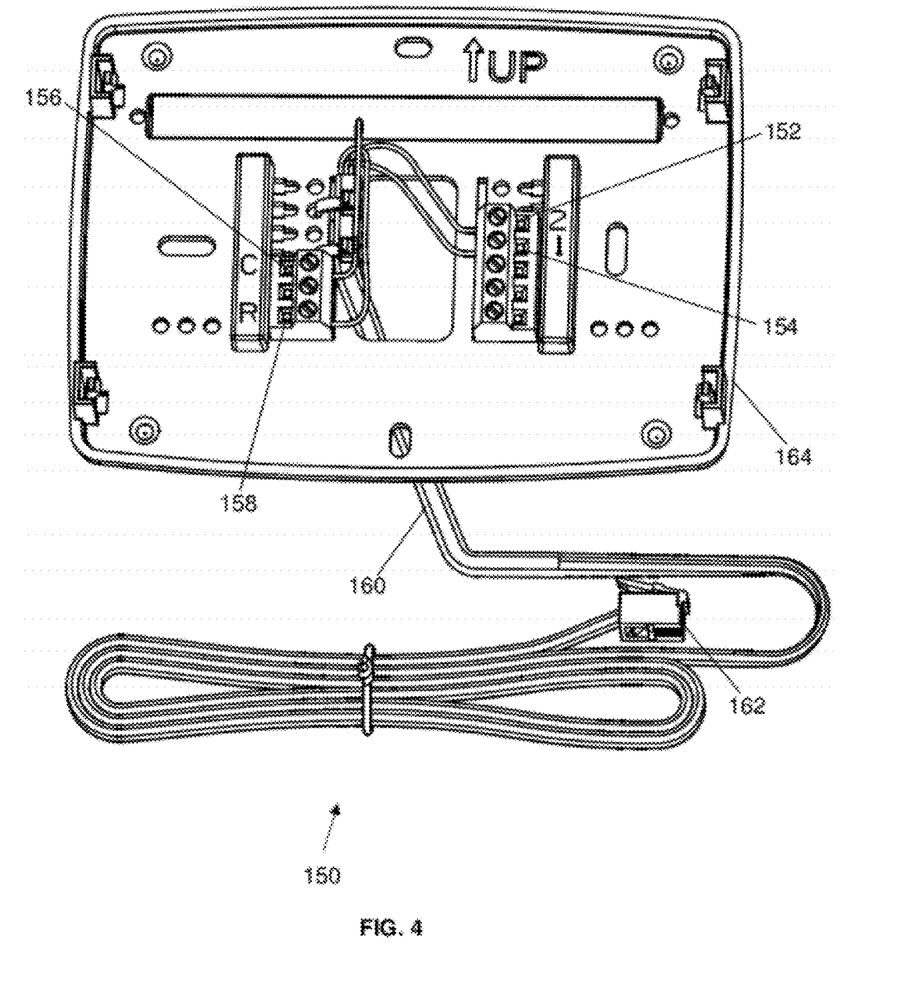
FIG. 4 is a front perspective view of one embodiment of a connection tool for use with the user interface and controller shown in FIGS. 2 and 3.

Referring to FIG. 4, a communication means is shown for use in configuring the controller 100 in FIG. 3. The communication means may be a connection tool 150 with connectors 152, 154, which are releasably connectable to the user interface 38 (in FIG. 2) and coupled to a wiring harness 160 that is connectable to the input means 102 (in FIG. 3), for enabling communication from the user interface 38 to the controller 100. In one embodiment, the connection tool 150 includes two connectors 152, 154 for connecting to the first and second communication connections "1" and "2" of the user interface 38, and may further include two connectors 156, 158 that connect or mate with connections "R" and "C" for providing power to the user interface 38 (in FIG. 2). The input means 102 preferably comprises an RJ-11 receptacle, and the wiring harness 160 preferably includes an RJ-11 plug connector 162 that connects to the RJ-11 receptacle of the controller 100. The connection tool 150 may comprise a suedo-sub-base 164, which mates with the user interface 38 in a manner such that the connectors 152, 154 are connectable to the user interface 38 (e.g., connections "1" and "2") when the user interface 38 is mated to the connection tool 150.

Accordingly, the user interface 38 (or thermostat) may be removed from the sub-base portion 46 installed in the space 10, and taken to the location of the controller 100 where the user interface 38 is connected to a connection tool 150 (having connectors 152, 154 releasably connectable to the user interface 38 and coupled to a wiring harness 160 that connects to the controller 100), to enable communication from the user interface 38 to the controller 100. Once connected, the user interface 38 display 40 displays selectable setting parameters for configuring the controller 100, and user input controls 42, 44 enable selection of the displayed selectable setting parameters.

Figure 5:
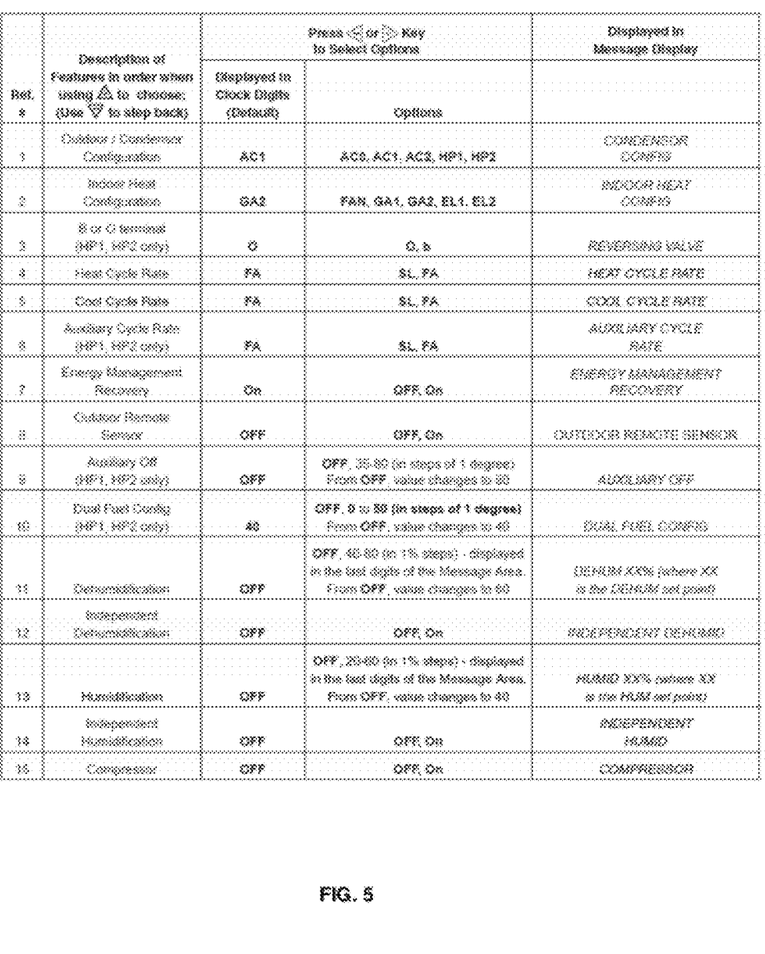
FIG. 5 is a table illustrating the plurality of displayed selectable setting parameters for configuring the controller to control operation of at least one of a plurality of climate control apparatus, in accordance with the present disclosure.

The user interface 38 comprises input controls 42, 44 for selection from the display 40 of one or more displayed selectable setting parameters, which are listed in the Table shown in FIG. 5. The display of one or more selectable setting parameters enable a user or installer to set-up the controller 100. For example, the controller 100 may be set-up for a configuration in which there is no air conditioner unit 20 (e.g., option AC0). The controller 100 may be set-up for a configuration in which the air conditioner/compressor 22 has a single speed or capacity (e.g., option AC1) as shown in FIG. 1, or may also be set-up for a configuration in which the compressor 22 has two speeds or capacity levels (e.g., option AC2) as shown in FIG. 3 where compressor 22 has a Y and Y2 connection. With option AC2, the controller 100 is configured to provide different activation signals for activating the compressor in a full-capacity mode and a less than full capacity mode (e.g., "Y" and "Y2"). Similarly, the controller 100 may be set up to operate a compressor 22 in a single capacity heat pump mode (e.g., option HP1) or a dual capacity heat pump mode (e.g., option HP2).

The various controller embodiments may be set-up as shown in FIG. 5 for a configuration (e.g., option GA1) in which an indoor air circulation unit 12 operates with a single capacity gas-fired heating unit 14 as in FIG. 1, or optionally with a dual capacity gas-fired heating unit (e.g., option GA2). The controller may be set-up for a configuration in which the indoor air circulation unit 12 also operates with a single capacity heater using electric heating elements 16 (e.g., option EL1) or optionally a dual capacity heater using electric heating elements 16 (e.g., option EL2). The controller 100 can also be configured (e.g., option FAN) to operate indoor air circulation unit 12 only as a fan during heat-pump mode, for example.

Accordingly, in one preferred embodiment, the controller 100 of FIG. 3 may be set-up by using the user interface 38 to select option "AC1" for a typical air conditioning system and option "GA1" for a gas-fired heating unit 14. In yet another embodiment, the controller 100 may be set-up using the user interface 38 to select option "HP1" for an air conditioning system and heat pump system, and option "FAN" for operation of the indoor air circulation unit 12 simultaneous with the compressor 22 of the heat pump. Alternatively, the controller 100 may be set-up for "dual heating systems" by selection of option "HP1" for an air conditioning system and heat pump system, and option "GA1" for a gas-fired heating unit 14. The criticality of proper configuration of the controller 100 for such systems is explained below.

In situations of dual heating systems, the heat-pump supplies heat to the space 10 during above-freezing outside temperature conditions, and the gas-fired heating unit 14 may supply additional heat to the space 10 during sub-freezing outside temperatures (when sub-freezing temperatures limit heating by the heat pump). Accordingly, where the controller 100 is configured for "HP1" and "GA1" setting parameters, the controller 100 may generate an activation signal for turning on the gas-fired heating unit 14 (via "W" as shown in FIG. 3), an activation signal for turning on the compressor 22 (via "Y" as shown in FIG. 3), and an activation signal for turning on the reversing valve 26 (via "O" in FIG. 3).

The importance of proper set-up and configuration is illustrated by the B or O heat pump terminal set-up options. Depending on the type of heat pump, the controller 100 is configured by entering via the user interface 38 a selection for the "O/B" setting, as to whether the heat pump reversing valve 26 is switched "on" for cooling or "on" for heating operation. For example, with some heat pumps manufactured by Rheem, the "O/B" setting parameter for controller 100 must be configured to switch "on" the reversing valve 26 to provide heating operation, as in the above described configuration setting. However, with some heat pumps manufactured by Trane, an "O/B" setting for switching "on" the reversing valve 26 will provide cooling operation (with off being heat operation). In the situation of dual heating systems where the gas-fired heating unit 14 may be operated along with the heat-pump, an improper "O/B" setting can cause operation of the heat pump in cool mode in conflict with operation of the gas-fired heating unit 14 (e.g., will cause simultaneous operation of both the air conditioner unit 20 and the gas-fired heating unit 14).

The above miss-configuration could result in simultaneous operation of the air conditioner unit 20 and conventional gas-fired heating unit 14. If the controller 100 were inadvertently configured to turn on both the air conditioner unit 20 and gas-fired heating unit 14 at the same time, an installer who is within the space 10 might not be able to detect this operation within a short time, to prevent potential damage to the components of the air conditioner unit 20. By using the user interface 38 and connection tool 150 for selecting configuration setting parameters at the location of the controller 100 and climate control apparatus, the installer can select one or more configuration setting parameters and observe the operation of the climate control apparatus to test and confirm that settings have been correctly entered, without having to make back and forth trips from the space 10 to the climate control apparatus segregated from the space. Accordingly, the user interface 38 and connection tool 150 provide a novel approach for selecting one or more selectable configuration setting parameters of a configurable controller 100 at the location of the controller 100, to test and confirm that the proper setting parameters have been selected.

Figure 6:
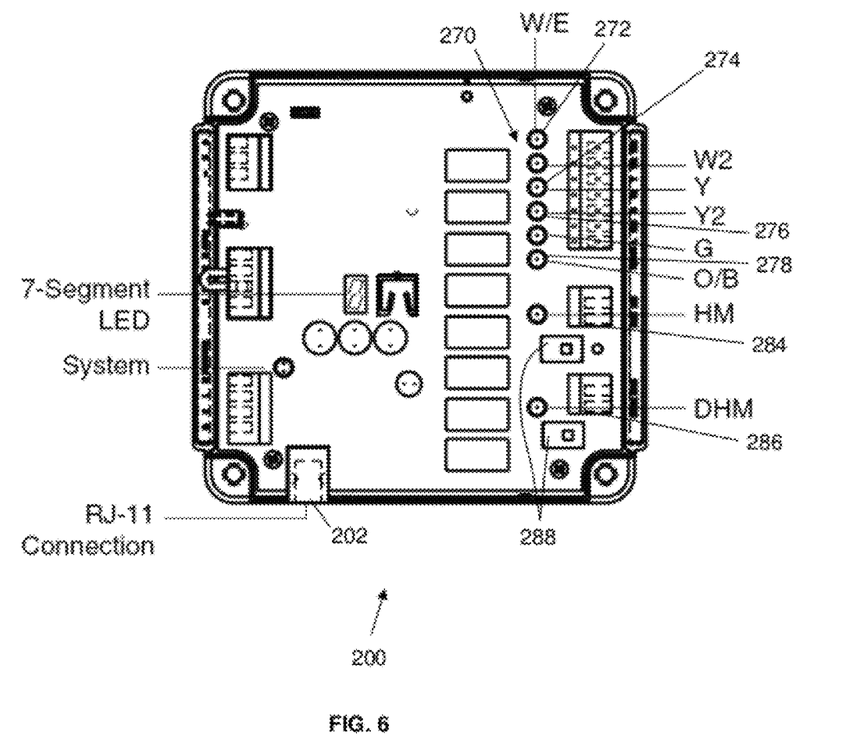
FIG. 6 is a front elevation view of a second embodiment of a controller for use in connection with at least one of a plurality of climate control apparatus.

According to another aspect of the present disclosure, another embodiment of a controller 200 provides a visual indicator, such as a light emitting diode for example, for indicating the selection of a setting parameter via user interface 38 to provide for confirmation of the selected setting parameter. As shown in FIG. 6, the controller 200 includes an input means 202 for receiving communication of a selection of at least one setting parameter, and a plurality of visual indicators 270. The indicators 270 indicate a selection (via the user interface 38) of at least one configuration setting parameter of the controller 200.

The selection of at least one configuration setting parameter is made through the user interface 38, by user input controls 42, 44 for selecting from a plurality of displayed selectable setting parameters, and communicated to via connection tool 150 to the controller 200, which illuminates or activates at least one visual indicator 270 for indicating a selection of at least one selectable setting parameter by the user interface 38, where the visual indicator 270 may be an LED or elements of an LCD display that may be activated. Specifically, the controller 200 illuminates or activates a corresponding indicator on the controller 200 that corresponds with a given selection made via the user interface 38. For example, where the user interface 38 is used in selection of a configuration for a single capacity gas-fired heating unit 14 (e.g., option W1) the controller 100 is configured to receive communication of the selection and activate a "W" visual indicator 272 for indicating selection of the selectable setting parameter "W1" by the user interface 38. Where the user interface 38 is used in selection of a configuration in which the air conditioner unit 20 has a single speed or capacity (e.g., option AC1), the controller 200 is configured to receive communication of the selection and activate a "Y" visual indicator 274 for indicating selection of the selectable setting parameter "AC1" by the user interface 38. Similarly, where the user interface 38 enters a selection of a configuration of a two speed/capacity air conditioner (option AC2), the controller 200 is configured to receive communication of the selection and activate a "Y2" visual indicator 276 for indicating selection of setting parameter "AC2." Where the user interface 38 enters the selection of a configuration of a heat pump with a reversing valve 26 (option O), the controller 200 is configured to receive communication of the selection and activate an "O/B" visual indicator 278 for indicating selection of setting parameter "O." Accordingly, the controller 200 receives communication of a selection and activates a visual indicator that corresponds with the selection to provide for confirmation.

Figure 7:
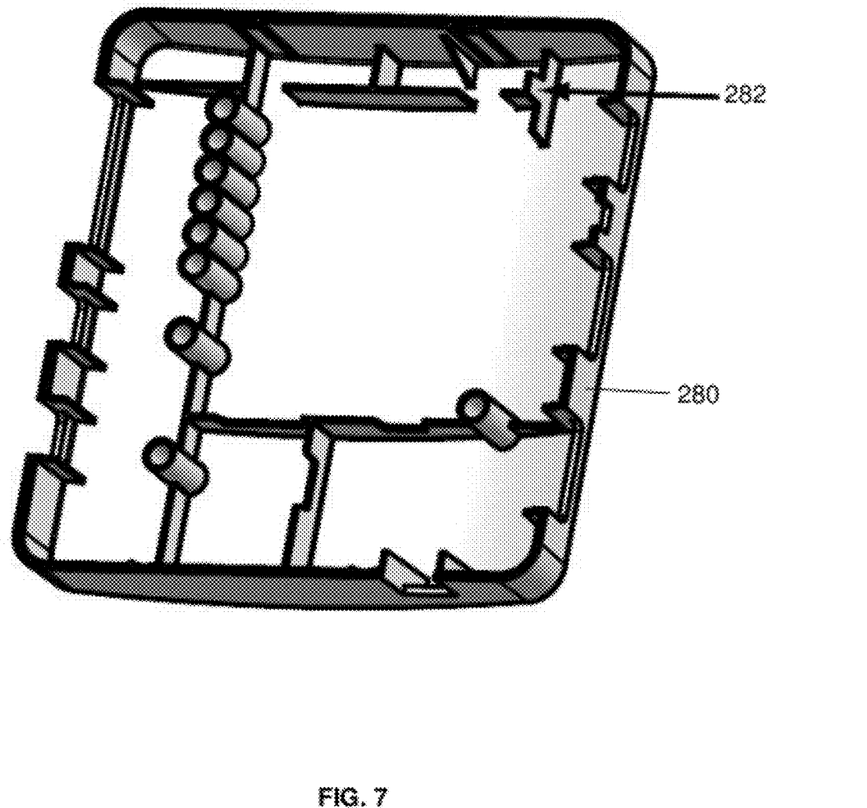
FIG. 7 is a perspective view of a cover for the controller in FIG. 6, in accordance with the present disclosure.

The controller 200 in FIG. 6 is not only configured to control activation of the visual indicators 270 corresponding to a selection, but also to control the color of the indicator to correspond with the given configuration. For example, with regard to selection of a heating system configuration via the user interface 38, the controller 200 will respond to selection of a gas-fired heating unit 14 (as in FIG. 1) by activating the "W" visual indicator 272 in a manner to cause the "W" visual indicator 272 to glow an amber color. Alternatively, the controller 200 will respond to selection of a heater using electric heating elements 16 (as in FIG. 1) by activating the "W" visual indicator 272 in a manner to cause the "W" visual indicator 272 to glow a green color. This can be accomplished by providing different voltage inputs to a multi-color LED, for example, or by controlling elements of a color LCD display. Accordingly, not only does the "W" visual indicator 272 provide an immediate indication of selection of a heating system configuration setting parameter, the "W" visual indicator 272 also provides an indication of the system type that the controller 200 is being configured for. The controller 200 may also include a cover 280 with a tab 282 located thereon, as shown in FIG. 7. The tab 282 engages a switch or electrical component to cause the controller 200 to prevent the visual indicators 270 from being activated when the cover 280 is installed, to prevent nuisance concerns with the visual indicators. However, the controller 200 may be configured to permit display of the visual indicators when the cover 280 installed, by removal of a portion of the tab 282 (e.g., breaking off the end).

Accordingly, one embodiment of a configurable system is provided for controlling various types of climate control apparatus that provided visual confirmation of configuration settings. The system includes a controller 200 (shown in FIG. 6) mountable to a climate control apparatus (e.g., indoor air circulation unit 12 shown in FIG. 1 that is segregated from the space 10 to be conditioned). The controller 200 has a plurality of selectable setting parameters for configuring the controller to control operation of at least one of a plurality of climate control apparatus, and a plurality of visual indicators 270, each of which provide an indication of the selection of a selectable setting parameter. The controller 200 also has an input means 202 for receiving communication of information indicating a selection of at least one of the selectable setting parameters. The system includes a user interface (e.g. user interface 38 in FIG. 2) adapted for installation within a space 10 (shown in FIG. 1). The user interface 38 has a display 40 configured to display the selectable setting parameters, and user-input controls 42, 44 for enabling selection of at least one displayed selectable setting parameter, as shown in FIG. 2. A communication means (in FIG. 4) provides for communicating information from the user interface 38 (in FIG. 2) to the controller 200 shown in FIG. 6 that is indicative of the selection of at least one selectable setting parameter. The controller 200 is configured to activate at least one visual indicator 270 for indicating selection of a selectable setting parameter by the user interface 38 via the communication means. The controller 200 may further include a cover 280 having a tab 282 on an interior portion of the cover 280, wherein the tab 282 causes the controller 200 to prevent activation of the visible indicators 270 when the cover 280 is installed on the controller 200.

In yet another aspect of the present disclosure, the various controller embodiments are further configured to control a humidity control. For example, the controller 200 shown in FIG. 6 is configured to control a switch to establish a connection at 284 for applying a voltage via controller 200 for activating a humidity control 32 (shown in FIG. 1) at the same time as the indoor air circulation unit 12 (shown in FIG. 1). Alternatively, where the humidity control 32 is self-powered, the controller 200 may close a switch to establish a connection (at 286) for activating a self-powered humidity control 32. Accordingly, the controller 200 is configured to activate a self-powered humidifier (or dehumidifier) or to pass through a 24 volt alternating current to a non self-powered humidifier (or dehumidifier). The controller 200 is further configurable to operate self-powered or non self-powered humidity controls with either a single fixed speed indoor air circulation unit 12, or a variable speed indoor air circulation unit 12. The HM and DHM symbols shown in FIG. 6 correspond to wiring terminals 284 and 286 on the controller 200.

The selection of a setting parameter for HM or HM2, or DHM or DHM2, is made using a selector component, such as a 2 position slide switch 288 located on the controller 200. When the switch is slid to the "dry" position, the choice is made for a self powered device, and the controller 200 simply closes a connection for passing power through the terminal and/or appropriate relay on the controller 200 for activating a self-powered humidity control 32 as in FIG. 1. When the 2 position slide switch 288 is slid to the other position, the controller 200 uses the 24 volt alternating current from a system transformer (e.g., 34 in FIG. 3) to operate the non self-powered humidifier or dehumidifier. In addition the controller 200 can operate the humidifier or dehumidifier independent of a call for heat or cool (e.g., not simultaneous with operation of a heating or air conditioning system). Thus, when a sensed relative humidity is detected by a user interface 38 (in FIG. 2) or a thermostat, for example, the indoor air circulation unit 12 in FIG. 1 is turned on along with the appropriate humidity control 32 (e.g., humidifier or dehumidifier) and operated until the requested relative humidity set point is reached. If the controller 200 is not configured for operation in independent mode, then the humidity control 32 only operates during a call for heat or cool. This provides the novel feature of a controller 200 that is configurable to utilize detection of sensed relative humidity by the user interface 38 (or thermostat) to control an independent humidifier or dehumidifier without requiring the use of a separate thermostat for the independent humidifier or dehumidifier. Accordingly, a system is provided for controlling various climate control apparatus for conditioning a space that comprises a controller mountable to a climate control apparatus segregated from the space, which has a plurality of selectable setting parameters for configuring the controller to control operation of at least one of a plurality of climate control apparatus. The controller further includes an input means for receiving communication of information that is indicative of a selection of at least one selectable setting parameter. Based on the selection of at least one selectable setting parameter, the controller is configured to selectively operate the humidity control device at times when the controller has not activated a heating or air conditioning unit, or to selectively operate the humidity control device at times when the controller activates a heating or air conditioning unit. The various embodiments of a controller may be configured to cause the visual indicators to blink to provide a notice of an inappropriate set-up or configuration. Thus, controller 100 is further configurable to provide notice to an installer of the improper set-up.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for controlling various types of climate control apparatus for conditioning a space, the system comprising:
   a controller mountable to a climate control apparatus that is segregated from the space to be conditioned, the controller including selectable setting parameters for configuring the controller to control at least one of a plurality of climate control apparatus, and an input means for receiving communication indicative of a selection of at least one of the selectable setting parameters;
   a sub-base adapted for installation within the space;
   a user interface releasably connectable to the sub-base, having a display configured to display selectable setting parameters for configuring the controller, and user input controls for enabling selection of at least one selectable setting parameter; and
   a communication means for enabling communication, from the user interface to the controller, that is indicative of the selection of at least one selectable setting parameter,
   wherein the user interface is releasable from the sub-base and connectable to the controller to enable selection of at least one selectable setting parameter via the user interface at the location of the controller, and
   wherein the controller further includes a switch for supplying low voltage via the controller to activate a humidity control.

2. The system of claim 1 wherein the communication means comprises a connection tool having a plurality of connectors that are releasably connectable to the user interface and coupled to a wiring harness that is connectable to the input means of the controller, for enabling communication from the user interface to the controller.

3. The system of claim 2 wherein the connection tool includes at least two connectors that mate with first and second communication connections for enabling communication with the user interface.

4. The system of claim 3 wherein the input means of the controller comprises an RJ-11 receptacle, and the wiring harness includes an RJ-11 connector configured to connect to the RJ-11 receptacle, to thereby enable communication from the user interface to the controller.

5. The system of claim 1 wherein the user interface and controller are configured to be connected to each other by at least a pair of wires that enable communication therebetween, whereby the controller and user interface may be connected via existing wires within the space for a previous installed thermostat.

6. The system of claim 1 further comprising a plurality of indicators for providing a visible indication of the selection of a selectable setting parameter, wherein the controller is configured to activate at least one indicator for indicating a selection of at least one selectable setting parameter by the user interface.

7. The system of claim 1 wherein the user interface is configured to be removed from the sub-base in the space and taken to the location of the controller where the user interface is connectable to a connection tool for communicating information from the user interface to the controller, such that configuration setting parameters may be selected via the user interface without requiring travel between the space and the controller to confirm entry of settings.

8. A system for controlling various types of climate control apparatus for conditioning a space, the system comprising:
   a controller mountable to a climate control apparatus that is segregated from the space to be conditioned, the controller including selectable setting parameters for configuring the controller to control at least one of a plurality of climate control apparatus, and an input means for receiving communication indicative of a selection of at least one of the selectable setting parameters;
   a sub-base adapted for installation within the space;
   a user interface releasable connectable to the sub-base, having a display configured to display selectable setting parameters for configuring the controller, and user input controls for enabling selection of at least one selectable setting parameter; and
   a communication means for enabling communication, from the user interface to the controller, that is indicative of the selection of at least one selectable setting parameter,
   wherein the user interface is releasable from the sub-base and connectable to the controller to enable selection of at least one selectable setting parameter via the user interface at the location of the controller, and
   wherein the controller further includes a switch for closing a connection to activate a self-powered humidity control.

9. A system for controlling various types of climate control apparatus for conditioning a space, the system comprising:
   a controller mountable to a climate control apparatus that is segregated from the space to be conditioned, the controller including:
      a plurality of selectable setting parameters for configuring the controller to control at least one of a plurality of climate control apparatus,
      a plurality of visual indicators, each of which provide an indication of the selection of a selectable setting parameter, and an input means for receiving communication indicative of a selection of at least one selectable setting parameter; and a user interface adapted for installation within the space, having a display configured to display the selectable setting parameters for configuring the controller, and user-input controls for enabling selection of at least one of the displayed selectable setting parameters; and a communication means for enabling communication, from the user interface to the controller, that is indicative of the selection of at least one selectable setting parameter, wherein the controller is configured to activate at least one visual indicator for indicating a selection of at least one selectable setting parameter by user interface; and wherein the controller further includes a switch for supplying low voltage via the controller to activate a humidity control.

10. The system of claim 9 wherein the visual indicator is a light emitting diode configured to be illuminated to display at least one color.

11. The system of claim 9 wherein the visual indicator is an element of a portion of an LCD display.

12. The system of claim 9 wherein the communication means comprises a connection tool having a plurality of connectors that are releasably connectable to the user interface and coupled to a wiring harness that is connectable to the input means of the controller, for enabling communication of information from the user interface to the controller.

13. The system of claim 12 wherein the connection tool includes at least two connectors that mate with first and second communication connections for enabling communication with the user interface.

14. The system of claim 9 wherein the controller can operate the humidity control device independently at times when a heating or air conditioning unit is not activated by the controller and not operating.

15. The system of claim 9 further comprising a connection between the controller and sub-base that enables communication between the controller and user interface, whereby the controller may communicate via the connection to the user interface when connected to the sub-base within the space.

16. A system for controlling various types of climate control apparatus for conditioning a space, the system comprising:

a controller mountable to a climate control apparatus that is segregated from the space to be conditioned, the controller including a plurality of selectable setting parameters for configuring the controller to control at least one of a plurality of climate control apparatus, a plurality of visual indicators, each of which provide an indication of the selection of a selectable setting parameter, and an input means for receiving communication indicative of a selection of at least one selectable setting parameter; and a user interface adapted for installation within the space, having a display configured to display the selectable setting parameters for configuring the controller, and user-input controls for enabling selection of at least one of the displayed selectable setting parameters; and a communication means for enabling communication, from the user interface to the controller, that is indicative of the selection of at least one selectable setting parameter, wherein the controller is configured to activate at least one visual indicator for indicating a selection of at least one selectable setting parameter by user interface; and wherein the controller further includes a switch for closing a connection to activate a self-powered humidity control.

17. A system for controlling various types of climate control apparatus for conditioning a space, the system comprising:

a controller mountable to a climate control apparatus that is segregated from the space to be conditioned, the controller having a plurality of selectable setting parameters for configuring the controller to control operation of at least one of a plurality of climate control apparatus, a plurality of visual indicators, each of which provide an indication of the selection of a selectable setting parameter, and an input means for receiving communication of information indicating a selection of at least one of the selectable setting parameters; and a user interface adapted for installation within the space, having a display configured to display the selectable setting parameters for configuring the controller, and user-input controls for enabling selection of at least one displayed selectable setting parameter; and a communication means for communicating information from the user interface to the controller that is indicative of the selection of at least one selectable setting parameter, wherein the controller is configured to activate at least one visual indicator for indicating selection of a selectable setting parameter by the user interface via the communication means, and a cover for the controller having a tab on an interior portion of the cover, wherein the tab causes the controller to prevent activation of the visible indicators when the cover is installed on the controller.

18. The system of claim 17, wherein the tab is configured to engage a component to cause the controller to prevent activation of said visual indicators when the cover is installed on the controller.

19. The system of claim 17, wherein the tab of the cover includes a removable portion, which when removed permits activation of the visual indicators when the cover is installed on the controller.

20. The system of claim 17 wherein the communication means comprises a connection tool having a plurality of connectors that are releasably connectable to the user interface and coupled to a wiring harness that is connectable to the input means of the controller, for enabling communication of information from the user interface to the controller.

21. The system of claim 20 wherein the connection tool includes at least two connectors that mate with first and second communication connections for enabling communication with the user interface.

22. The system of claim 21 wherein the input means of the controller comprises an RJ-11 receptacle, and the wiring harness includes an RJ-11 connector configured to connect to the RJ-11 receptacle, to thereby enable communication from the user interface to the controller.

* * * * *